United States Patent
Yu et al.

(10) Patent No.: US 8,154,600 B2
(45) Date of Patent: Apr. 10, 2012

(54) METHOD AND SYSTEM FOR DISTRIBUTED MULTIPLE TARGET TRACKING

(75) Inventors: Ting Yu, Schenectady, NY (US); Peter Henry Tu, Niskayuna, NY (US); Ambalangoda Gurunnanselage Amitha Perera, Clifton Park, NY (US); Jens Rittscher, Ballston Lake, NY (US); Nils Oliver Krahnstoever, Schenectady, NY (US); Xiaoming Liu, Schenectady, NY (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1037 days.

(21) Appl. No.: 12/099,301

(22) Filed: Apr. 8, 2008

(65) Prior Publication Data

US 2008/0259163 A1    Oct. 23, 2008

Related U.S. Application Data

(60) Provisional application No. 60/912,945, filed on Apr. 20, 2007.

(51) Int. Cl.
    *H04N 5/225* (2006.01)
(52) U.S. Cl. ..................................... 348/169; 382/103
(58) Field of Classification Search ................ 348/169; 382/173, 103
    See application file for complete search history.

(56) References Cited

U.S. PATENT DOCUMENTS

| | | | | |
|---|---|---|---|---|
| 7,296,231 | B2 * | 11/2007 | Loui et al. | 715/723 |
| 7,885,794 | B2 * | 2/2011 | Liu et al. | 703/2 |
| 2003/0108220 | A1 * | 6/2003 | Jepson et al. | 382/103 |
| 2003/0219146 | A1 * | 11/2003 | Jepson et al. | 382/103 |
| 2004/0071317 | A1 * | 4/2004 | Pavlovie et al. | 382/103 |
| 2005/0091267 | A1 * | 4/2005 | Zhang et al. | 707/103 R |
| 2006/0280341 | A1 * | 12/2006 | Koshizen et al. | 382/118 |
| 2007/0003141 | A1 * | 1/2007 | Rittscher et al. | 382/181 |
| 2010/0081931 | A1 * | 4/2010 | Destrempes et al. | 600/437 |
| 2010/0238266 | A1 * | 9/2010 | Jojic et al. | 348/36 |

OTHER PUBLICATIONS

European Search Report dated Nov. 11, 2008.
Jordan et al., "An Introduction to Variational Methods for Graphical Models", Machine Learning, Kluwer Academic Publishers, Boston, MA, vol. 37, No. 2, XP002262080, pp. 183-234, Nov. 1, 1999.
Molnar et al., "Application of the EM Algorithm for the Multitarget/Multisensor Tracking Problem", IEEE Transactions on Signal Processing, IEEE Service Center, New York, NY, vol. 46, No. 1, XP011058015, pp. 115-129, Jan. 1, 1998.
Ting Yu, Ying Wu, Nils O. Krahnstoever, Peter H. Tu; Distributed Data Association and Filtering for Multiple Target Tracking; To Appear in IEEE Conf. on Computer Vision and Pattern Recognition, 2008; 9Pages.

* cited by examiner

*Primary Examiner* — Abdullahi Salad

(74) *Attorney, Agent, or Firm* — MH2 Technology Law Group, LLP

(57) ABSTRACT

A method and system for distributed tracking of multiple targets is disclosed. Multiple targets to be tracked by a plurality of trackers are detected in a frame. The motion state variable of each of the plurality of trackers is calculated in the E-step of a variational Expectation-Maximization algorithm. Further, the data association variable of each of the plurality of trackers is calculated in the M-step of the algorithm. Depending on the motion state variable and the data association variable, the multiple targets are tracked.

12 Claims, 8 Drawing Sheets

METHOD AND SYSTEM FOR DISTRIBUTED MULTIPLE TARGET TRACKING

CROSS REFERENCE TO RELATED APPLICATIONS

This application claims the benefit of U.S. Provisional Application No. 60/912,945 filed on Apr. 20, 2007, which is incorporated herein in its entirety by reference.

BACKGROUND OF THE INVENTION

This invention relates generally to multiple target tracking, and more particularly to a method and system for tracking multiple targets in a surveillance system.

Tracking multiple targets is important in many applications, such as, for example, video surveillance, traffic monitoring, human activity analysis, sports video analysis and so forth. In addition to tracking the location of a target, other properties of the target such as its velocity, scale etc. can also be tracked. Analysis of the track of a target enables prediction of the future path of the target so that appropriate action can be taken. For example, tracking human activities in a crowded area such as an airport is important so that unusual activities may be detected and any possible damage may be prevented.

It is easier to track targets whose appearances are distinctive since multiple independent single-target trackers can be used to track them. In such a situation, all targets other than a specific target can be viewed as background due to their distinct appearance. However, it is difficult to track multiple targets whose appearances are similar such as people in crowded spaces. Multiple target tracking is fundamentally different from single target tracking and requires complex data association logic to partition detected measurements to each individual data source, and establish their correspondence with the maintained trackers. This implies two important processes that decide the success of a multi-target tracking algorithm—tracker-measurement association and tracker filtering, which are, in essence, two interleaved properties. Further, such multiple target tracking has to deal with target occlusion, in addition to other problems associated with single target tracking. In other words, a target must be recognized and tracked even while it is occluded or blocked by other objects.

Common approaches to tackling this problem take a centralized representation of a joint association vector, which is then estimated either by exhaustive enumerations, such as joint probabilistic data association (JPDA) filter, or by probabilistic Monte Carlo optimization. However, in these methods, the computational complexity involved is tremendous, especially when a large amount of tracks and measurement data needs to be handled. Sampling-based approaches have also been proposed to model the joint likelihood function, thus estimating the combined state of all targets directly. Without resorting to explicitly computing the data association, the sampling-based approaches demonstrate the capabilities of tracking multiple targets when complex motions are present. However, due to the centralized nature of the joint state representation, the complexity of these approaches grows exponentially as the number of targets to be tracked increases.

In light of the above discussion, there is a need for a method providing reduced computational complexity for tracking multiple targets.

BRIEF DESCRIPTION OF THE INVENTION

An exemplary embodiment of the invention provides a method and system for distributed tracking of multiple targets in a surveillance system using a variational Expectation-Maximization (EM) algorithm. For each successive frame received, a detecting module detects multiple targets in the received frame and provides the detections to a tracking module. The tracking module includes a plurality of trackers. Each tracker calculates its own motion state variable in the E-step of the variational EM algorithm. Further, each tracker calculates its data association variable with one of the multiple target detections in the M-step of the variational EM algorithm. The distributed tracking system poses constraints on the values of data association variables of the plurality of trackers thereby preventing unreasonable data associations. Based on the calculated motion state variable and data association variable, each tracker tracks its corresponding target.

Another exemplary embodiment of the invention provides a tracker capable of calculating its own motion state variable and data association variable. Each tracker calculates its own motion state variable in the E-step of a variational EM algorithm. Further, each tracker calculates its data association variable associating the tracker with one of the multiple targets in the M-step of the variational EM algorithm and provides the information related to its calculated data association variable to other trackers in the distributed tracking system. Based on the calculated motion state variable and data association variable, each tracker tracks its corresponding target. Further, each tracker updates its own data association variable on the basis of the information received from the other trackers and is capable of tracking a target even when the target is partially occluded by an object or by another target.

These and other advantages and features will be more readily understood from the following detailed description of preferred embodiments of the invention that is provided in connection with the accompanying drawings.

DETAILED DESCRIPTION OF THE INVENTION

Various embodiments of the invention provide a method and system for distributed tracking of multiple targets. A variational Expectation-Maximization (EM) algorithm is used to calculate motion state variables and data association variables of a plurality of trackers. The plurality of trackers track their corresponding targets on the basis of the calculated motion state variables and data association variables.

Figure 1:
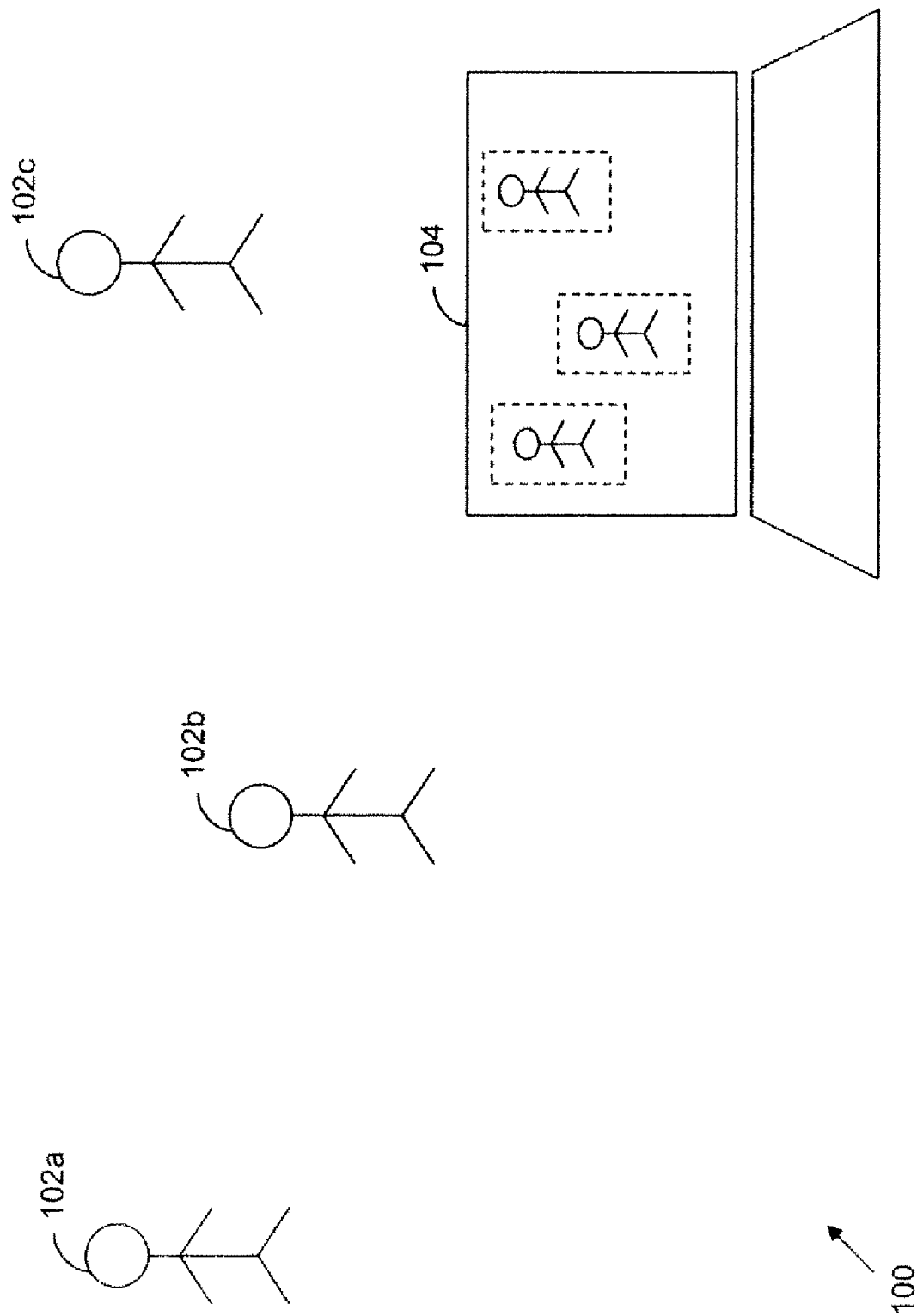
FIG. 1 depicts an environment in which embodiments of the invention may be practiced.

FIG. 1 depicts an environment 100 in which embodiments of the invention may be practiced. Environment 100 includes three targets 102a, 102b and 102c, and a display 104. Display 104 displays the targets being continuously tracked on its screen. Display 104 may be employed in a crowded area such as an airport, so that human activities at the airport can be tracked and unusual activities may be detected. Video images displayed on display 104 may be monitored by a human operator and/or reviewed later by a human operator. Such video images may also be monitored by an automated system, thus saving human labor and improving detection rates. Although FIG. 1 shows only three targets being tracked and displayed on a display, any suitable number of targets may be tracked and displayed on the display. Further, a number of displays also may be employed to facilitate multiple target tracking.

Figure 2:
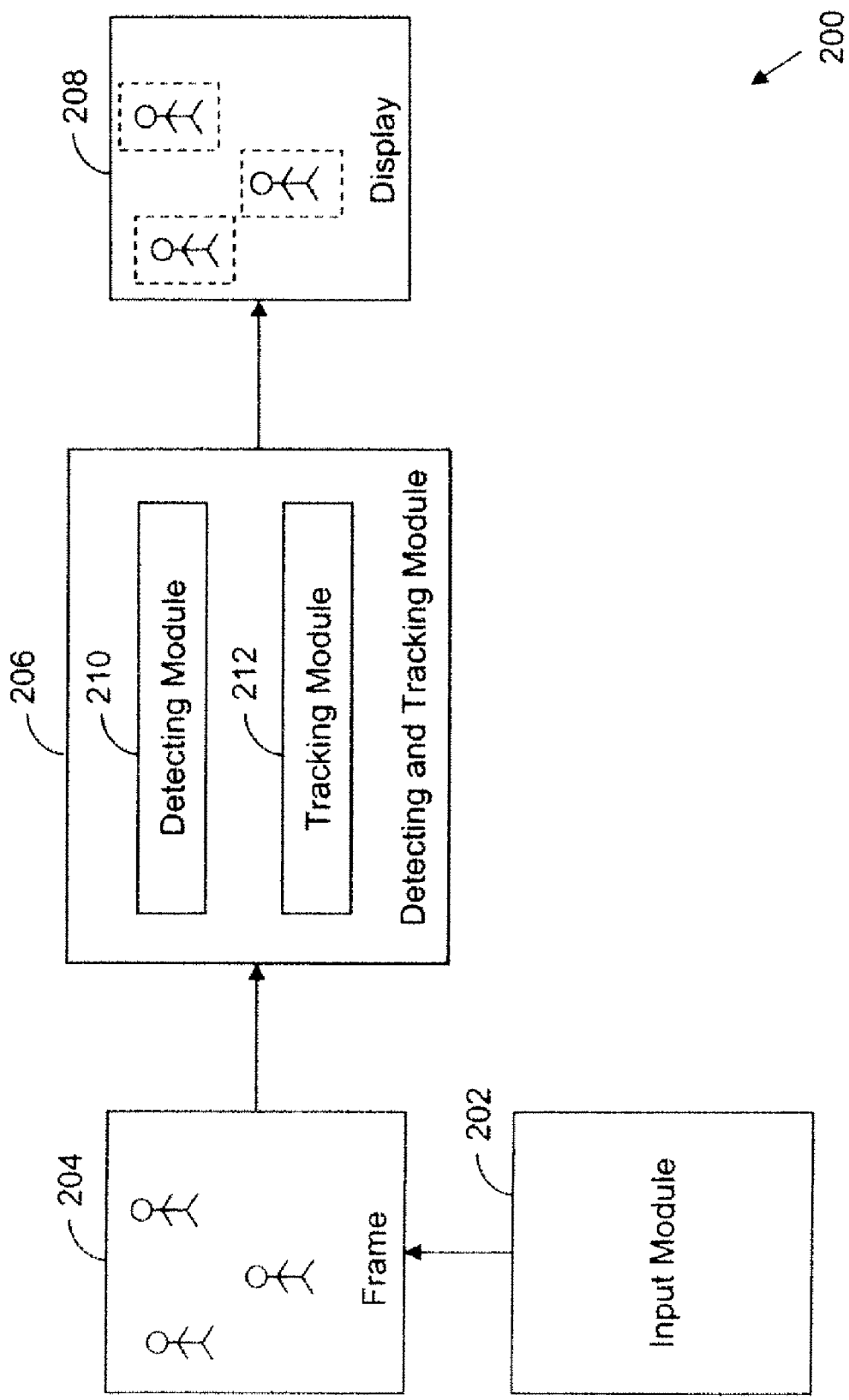
FIG. 2 is a block diagram depicting a system for multiple target tracking in accordance with an embodiment of the invention.

FIG. 2 is a block diagram depicting a system 200 for multiple target tracking in accordance with an embodiment of the invention. System 200 includes an input module 202, a frame 204, a detecting and tracking module 206, and a display 208. Detecting and tracking module 206 includes a detecting module 210 and a tracking module 212. Input module 202 provides frame 204 to detecting and tracking module 206. Detecting and tracking module 206 detects and tracks multiple targets present in frame 204 by using a variational Expectation-Maximization algorithm. Detecting and tracking module 206 provides its output to a display 208 that displays the multiple targets being tracked.

In accordance with various embodiments of the invention, input module 202 may be a normal CCTV video source or any other video source. Frame 204 includes multiple targets that need to be tracked. Thus, targets that are being tracked are received as a sequence of frames 204. Frame 204 comprises pixels and each pixel can have different characteristics such as brightness, contrast, color, and so forth. Display 208 may be any screen capable of displaying targets being tracked.

Detecting module 210 detects targets within frame 204. Detecting module 210 may detect the targets by techniques well known in the art. Tracking module 212 tracks the multiple targets by using a plurality of trackers that are initialized after the multiple targets are detected. The multiple targets are tracked by the plurality of trackers by using the variational EM algorithm iteratively. In particular, for every frame received, the multiple targets are detected and each tracker predicts the position of its corresponding target for the next frame and tracks its corresponding target using the variational EM algorithm. Each of the multiple targets may be shown in a rectangular region on display 208. The exact process of tracking the multiple targets is explained in detail in the paragraphs below.

Consider that, in a current frame t received from input module 202, $m_t$ measurements are detected by detecting module 210 and which are denoted by $Z_t$, where $Z_t = \{z_{1,t}, z_{2,t}, \ldots, z_{m_t,t}\}$. Each measurement refers to a different target being detected in the current frame t. The measurement data collected over a complete set of frames is depicted by $Z^t$, where $Z^t = \{Z_1, Z_2, \ldots, Z_t\}$.

In accordance with various embodiments of the invention, M trackers are represented in a distributed manner and each tracker i, where i represents tracker identifier and $i \in \{1, 2, \ldots, M\}$, has two unknown variables to be estimated, $\{a_{i,t}, x_{i,t}\}$. In other words, every tracker i is considered to be associated with a data association variable, $a_{i,t}$ and a motion state variable, $x_{i,t}$ which need to be determined for tracking a target correctly. $a_{i,t}$ denotes data association variable of tracker i and can take values from a discrete set $\{0, 1, \ldots, m_t\}$. Thus, the tracker i can associate itself with every possible measurement $z_{a_{i,t},t}$ from $Z_t$, or associate itself with nothing, that is, $a_{i,t}=0$. In particular, $a_{i,t}=0$ indicates missing detection of a target or the target disappearing from the field of view. Similarly, $x_{i,t}$ denotes motion state variable of the tracker i. Depending on each specific application scenario, $x_{i,t}$ may describe properties of the target, such as target location, velocity, scale, and the like. The data association and motion state variables of the M trackers are denoted as $a_t = \{a_{1,t}, a_{2,t}, \ldots, a_{M,t}\}$, $x_t = \{x_{1,t}, x_{2,t}, \ldots, x_{M,t}\}$. Each of the M trackers is assigned a unique identification (ID).

In essence, multiple target tracking algorithms deal with the problem of estimating a posteriori probability $p(x_t, a_t | Z^t)$ which requires complex computation capability due to the heavily interleaved nature of $\{a_t, x_t\}$. In accordance with various embodiments of the invention, a marginal posteriori is estimated over one variable and the other variable is treated as hidden under missing data formulation. Further, the multiple targets tracking problem is solved by iteratively repeating the variational EM algorithm.

In accordance with various embodiments of the invention, the motion state variable of the tracker, that is, $x_t$ is considered as the missing variable. This provides a continuously increased estimation of a probabilistic distribution over $x_t$ in the E-step of EM iterations. Next, in the M-step, a point estimate (maximum a posteriori) of the data association variable $a_t$ is calculated which may be optimized by graph-based optimization techniques, such as multi-way graph cut algorithm and max-product belief propagation algorithm. Although the invention has been explained with respect to M-step following the E-step, it is apparent that the M-step may be performed prior to performing the E-step. The order in which the two steps are performed does not affect the output of the EM algorithm.

Accordingly, the multiple target tracking problem is formulated as a maximum a posteriori (MAP) estimation problem of the data association variable $a_t$ as follows:

$$a_t^* = \underset{a_t}{\mathrm{argmax}}\, E(a_t) = \underset{a_t}{\mathrm{argmax}}\, \log p(a_t | Z^t) \qquad (1)$$

where $E(a_t)$ represents the original objective function that needs to be maximized. Eqn. (1) can also be represented in the following form:

$$a_t^* = \underset{a_t}{\mathrm{argmax}}\, \log \int_{x_t} p(a_t, x_t | Z^t) dx_t \qquad (2)$$

From Jensen's inequality, a function $Q(x_t)$ is introduced in Eqn. (2) as $$\begin{aligned} a_t^* &= \underset{a_t}{\mathrm{argmax}}\, \log \int_{x_t} Q(x_t) \frac{p(a_t, x_t | Z^t)}{Q(x_t)} dx_t \\ &\geq \underset{a_t, Q(x_t)}{\mathrm{argmax}} \int_{x_t} Q(x_t) \log \frac{p(a_t, x_t | Z^t)}{Q(x_t)} dx_t \\ &= \underset{a_t, Q(x_t)}{\mathrm{argmax}}\, \tilde{E}(a_t, Q(x_t)) \end{aligned} \qquad (3)$$

where the equality holds only when optimal association $a_t^*$ is determined and $Q(x_t) = p(a_t^*, x_t | Z^t)$. Maximizing the original objective function $E(a_t)$ can be achieved by iteratively maximizing the lower bound function $\tilde{E}(a_t, Q(x_t))$ over its two unknown properties, $a_t$ and $Q(x_t)$.

In principle, though $Q(x_t)$ can be defined as any valid probabilistic distribution over $x_t$, in this case, $Q(x_t)$ is defined as $$Q(x_t) = \prod_i^M Q_i(x_{i,t}) \quad (4)$$

where each factorial $Q_i(x_{i,t})$ approximates the unknown marginal probabilities $p(x_{i,t}|Z^t)$.

From Eqn. (3), the maximization of the lower bound function $\tilde{E}(a_t, Q(x_t))$ can be expressed as $$\begin{aligned}\max_{a_t,Q(x_t)} \tilde{E}(a_t, Q(x_t)) &= \max_{a_t,Q(x_t)} \int_{x_t} Q(x_t)\log p(a_t, x_t | Z^t) dx_t + \\ &\quad H(Q(x_t)) \\ &= \max_{a_t,Q(x_t)} \int_{x_t} Q(x_t)\log p(a_t, x_t | Z^t) dx_t + \\ &\quad H(Q(x_t)) + \log p(Z_t | Z^{t-1}) \\ &= \max_{a_t,Q(x_t)} \int_{x_t} Q(x_t)\log p(a_t, x_t, Z_t | Z^{t-1}) dx_t + \\ &\quad H(Q(x_t)) \end{aligned} \quad (5)$$

where $H(Q(x_t))$ is the entropy of $Q(x_t)$ and $p(Z_t|Z^{t-1})$ is an added constant. Applying the chain rule to the term $p(a_t, x_t, Z_t|Z^{t-1})$, $$p(a_t, x_t, Z_t|Z^{t-1}) = p(x_t|Z^{t-1})p(a_t|x_t, Z^{t-1})p(Z_t|a_t, x_t, Z^{t-1}) \quad (6)$$

Using a Markovian assumption, the priori probability of the data association variable $p(a_t|x_t, Z^{t-1})$ may be simplified as $p(a_t|x_t, Z^{t-1}) = p(a_t|x_t)$ and the likelihood model as $p(Z_t|a_t, x_t, Z^{t-1}) = p(Z_t|a_t, x_t)$. Maximization of the lower bound function in Eqn. (5) can then be expressed as $$\max_{a_t,Q(x_t)} \tilde{E}(a_t, Q(x_t)) = \quad (7)$$
$$\max_{a_t,Q(x_t)} H(Q(x_t)) + \int_{x_t} Q(x_t)\log[p(x_t|Z^{t-1})p(a_t|x_t)p(Z_t|a_t, x_t)]dx_t$$

Thus, to solve the multiple target tracking problem, each of the three distributions, namely, prediction probability $p(x_t|Z^{t-1})$, priori probability of the data association variable $p(a_t|x_t, Z^{t-1})$, and likelihood model $p(Z_t|a_t, x_t, Z^{t-1})$ need to be modeled.

Motion Prediction, $p(x_t|Z^{t-1})$: It can be seen that the term $p(x_t|Z^{t-1})$ in Eqn. (6) is the motion prediction model of the trackers and can be expressed as $$p(x_t | Z^{t-1}) = \int_{x_{t-1}} p(x_t|x_{t-1})p(x_{t-1}|Z^{t-1})dx_{t-1} \quad (8)$$

This joint motion posteriori $p(x_{t-1}|Z^{t-1})$ can be suitably approximated via the product of its marginal components $p(x_{i,t-1}|Z^{t-1})$ as $$p(x_{t-1}|Z^{t-1}) \approx \prod_{i=1}^M p(x_{i,t-1}|Z^{t-1}) \quad (9)$$

Assuming that the optimal Q-function $Q_i^*(x_{i,t-1})$ for tracker i from frame t-1 is a good approximation of the tracker's motion posteriori $p(x_{i,t-1}|Z^{t-1})$ and also employs an independent dynamics model, where $$p(x_t|x_{t-1}) = \prod_{i=1}^M p(x_{i,t}|x_{i,t-1}),$$

the joint motion prediction model $p(x_t|Z^{t-1})$ may be simplified as:

$$p(x_t|Z^{t-1}) \approx \prod_{i=1}^M \int_{x_{i,t-1}} p(x_{i,t}|x_{i,t-1})Q_i^*(x_{i,t-1})dx_{i,t-1} \quad (10)$$

Association Priori, $p(a_t|x_t)$: The association priori, $p(a_t|x_t)$, is the priori probability of the association variable $a_t = \{a_{1,t}, a_{2,t}, \ldots, a_{M,t}\}$ and is explained in conjunction with FIG. 3.

Likelihood model, $p(Z_t|a_t, x_t)$: The likelihood model, $p(Z_t|a_t, x_t)$, is the joint likelihood model of the measurement data $Z_t$, conditioned on $(a_t, x_t)$. Further, $$p(Z_t|x_t) \neq \prod_{i=1}^M p(z_{i,t}|x_{i,t}).$$

If $a_t$ is provided, this joint likelihood model can be factorized, since it is known which measurement data $z_{a_{i,t},t}$ is generated from each tracker $x_{i,t}$, that is, $$p(Z_t|a_t, x_t) = \prod_{i=1}^M p(z_{a_{i,t},t}|x_{i,t}) \quad (11)$$

Figure 3:
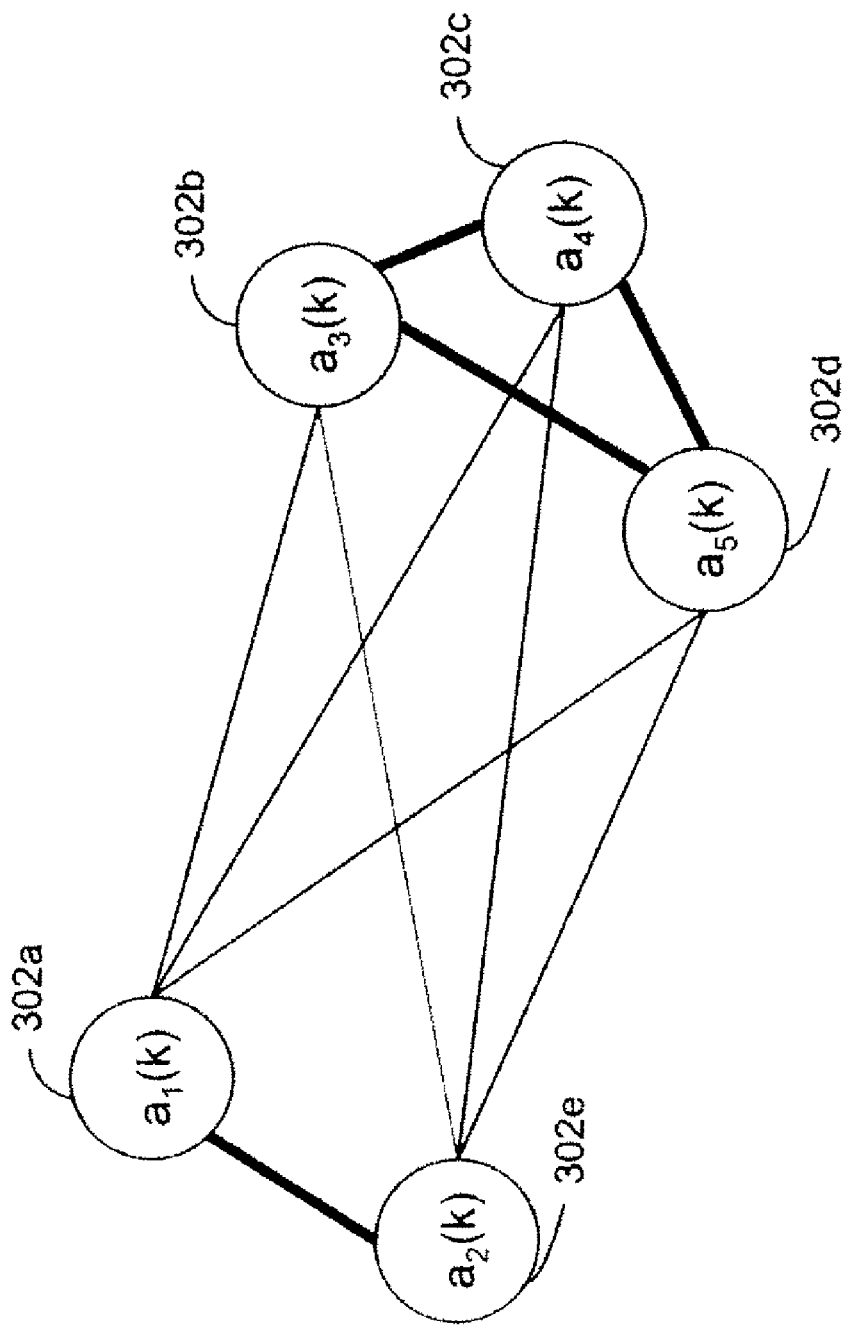
FIG. 3 depicts pair-wise data association constraint of multiple trackers in accordance with an embodiment of the invention.

FIG. 3 depicts pair-wise data association constraint of multiple trackers in accordance with an embodiment of the invention. FIG. 3 includes association variables 302a, 302b, 302c, 302d and 302e, all logically connected to each other. Conditioned on motion state variables $x_t$, $p(a_t|x_t)$ is the priori probability of the association variable $a_t = \{a_{1,t}, a_{2,t}, \ldots, a_{M,t}\}$ and can be formulated as a fully-connected but distributed pair-wise graph as shown in the figure. The corresponding probabilistic model can be expressed as $$p(a_t|x_t) = \frac{1}{Z_{x_t}} \prod_{(i,j) \in E} \psi(a_{i,t}, a_{j,t}|x_t) \quad (12)$$

where E denotes the set of neighboring trackers in which the association constraint is introduced, and $\psi(a_{i,t}, a_{j,t}|x_t)$ is the pair-wise constraint between $a_{i,t}$ and $a_{j,t}$. $Z_{x_t}$ is a partition function which is introduced to make $p(a_t|x_t)$ a proper probability distribution. In FIG. 3, each circle depicts an association variable of a tracker, and the edges connecting them represent the existence of pair-wise association constraints. The link edges between $\{a_1(k), a_2(k)\}$ and $\{a_3(k), a_4(k), a_5(k)\}$ are thickened to illustrate that the trackers in each of these two groups are spatially closer to each other.

In accordance with an embodiment of the invention, $p(a_t|x_t)$ is assumed to be independent of the trackers' motions $x_t$. Thus, $$p(a_t | x_t) = p(a_t) = \frac{1}{Z} \prod_{(i,j) \in E} \psi(a_{i,t}, a_{j,t}) \quad (13)$$

where $$\psi(a_{i,t}, a_{j,t}) = \begin{cases} 0, & \{a_{i,t} = a_{j,t} \neq 0\} \\ 1, & \text{otherwise} \end{cases} \quad (14)$$

Both $a_{i,t}$ and $a_{j,t}$ can choose values from the discrete measurement set $\{0, 1, \ldots, m_t\}$.

From the above discussion, it can be seen that the motion prediction, $p(x_t|Z_{t-1})$, the association priori $p(a_t|x_t)$, and the likelihood model $p(Z_t|a_t, x_t)$, all take factorized or distributed forms. Further, eqn. (7) can be written as $$\{a_t^*, Q^*(x_t)\} = \underset{a_t, Q(x_t)}{\mathrm{argmax}} \sum_{(i,j) \in E} \log \psi(a_{i,t}, a_{j,t}) - \log Z + \quad (15)$$

$$\sum_{i=1}^{M} \int_{x_{i,t}} Q_i(x_{i,t}) \left[ \log p(x_{i,t}|Z^{t-1}) p(z_{a_{i,t},t} | x_{i,t}) \right] dx_{i,t} + \sum_{i}^{M} H(Q_i(x_{i,t}))$$

Thus, the EM solution to the problem designated by Eqn. (15) involves solving two iterative steps, one step computing a better $Q'(x_t)$, and the other finding a better association $a_t'$. These two steps, that is, the E-step and the M-step, are solved by each tracker to track its corresponding target, and are explained in further detail with reference to FIG. 4.

Figure 4:
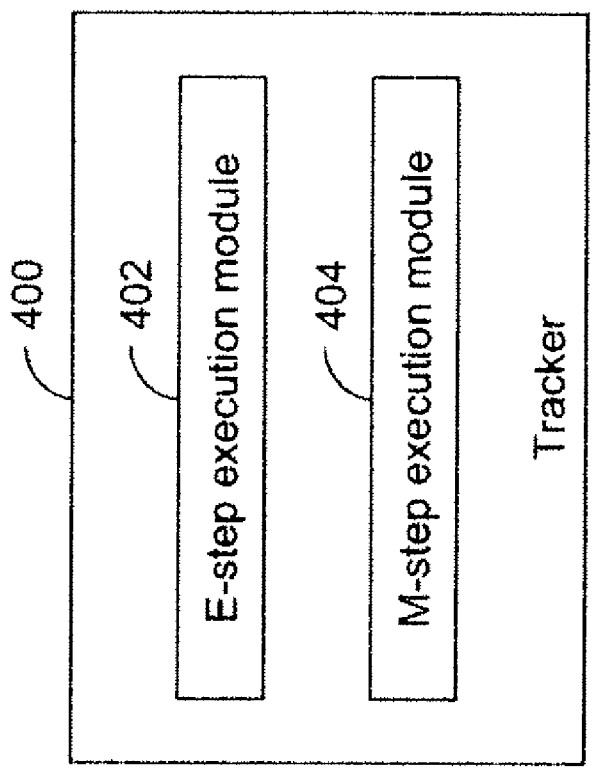
FIG. 4 is a block diagram depicting a tracker in accordance with various embodiments of the invention.

FIG. 4 depicts a block diagram of a tracker 400 in accordance with various embodiments of the invention. Tracker 400 includes an E-step execution module 402 and an M-step execution module 404. An E-step execution module 402 and an M-step execution module 404 calculate motion state variable and data association variable of tracker 400 respectively. Output of the E-step execution module 402 is given as input to the M-step execution module 404 and vice versa. Thus, these two modules implement the variational EM algorithm in tracker 400.

In particular, the E-step execution module 402 computes a better $$Q'(x_t) = \prod_{i=1}^{M} Q_i'(x_{i,t})$$

over the trackers' motions $x_t$ to maximize $E(a_t, Q(x_t))$. Further, M-step execution module 404 finds a better association $a_t' = \{a'_{1,t}, a'_{2,t}, \ldots, a'_{M,t}\}$ to maximize $E(a_t, Q'(x_t))$.

In the E-step, the partial derivative of the objective in Eqn. (15) over $Q_i(x_{i,t})$ is taken. Further, the constraint that each $Q_i(x_{i,t})$ must be a valid probabilistic distribution is applied, that is, $$\int_{x_{i,t}} Q_i(x_{i,t}) dx_{i,t} = 1$$

This constraint may be enforced which gives the E-step updating equation for each tracker i as $$Q_i'(x_{i,t}) \propto p(z_{a_{i,t},t}|x_{i,t}|Z^{t-1}) \quad (16)$$

In this case, the measurement data $z_{a_{i,t},t}$ used to filter $x_{i,t}$ is conditioned on the association variable $a_{i,t}$, which is estimated from the following M-step. It can be seen that the above E-step updating is composed with M independent updating equations, where each equation is for an individual tracker. A Kalman filter may be directly applied to compute the E-step in Eqn. (16) if the joint motion prediction model $p(x_t|Z_{t-1})$ in Eqn. (10) and the likelihood model $p(Z_t|a_t, x_t)$ in eqn. (11) are assumed to be Gaussian in nature.

In the M-step, an updated set of association variables $a_t = \{a_{1,t}, a_{2,t}, \ldots, a_{M,t}\}$ is determined to increase the objective given the already updated $Q'(x_t)$ from the E-step.

$$a_t' = \underset{a_t}{\mathrm{argmax}} \sum_{(i,j) \in E} \log \psi(a_{i,t}, a_{j,t}) + \quad (17)$$

$$\sum_{i=1}^{M} \int_{x_{i,t}} Q_i'(x_{i,t}) \log p(z_{a_{i,t},t} | x_{i,t}) dx_{i,t}$$

The following two terms are defined:

$$f_{i,j}(a_{i,t}, a_{j,t}) = \psi(a_{i,t}, a_{j,t}) \quad (18)$$

$$g_i(a_{i,t}) = \exp \left\{ \int_{x_{i,t}} Q_i'(x_{i,t}) \log p(z_{a_{i,t},t} | x_{i,t}) dx_{i,t} \right\}$$

which are the functions of $(a_{i,t}, a_{j,t})$ and $a_{i,t}$ respectively. Eqn. (17) can then be written as $$a_t' = \underset{a_t}{\mathrm{argmax}} \prod_{(i,j) \in E} f_{i,j}(a_{i,t}, a_{j,t}) \prod_{i=1}^{M} g_i(a_{i,t}) \quad (19)$$

The values $\{a_{1,t}, a_{2,t}, \ldots, a_{M,t}\}$ are from a discrete value set, and hence, both $f_{i,j}(a_{i,t}, a_{j,t})$ and $g_i(a_{i,t})$ can be computed before M-step optimization. The integral computation involved in Eqn. (18) may be analytically computed by assuming $Q_i(x_{i,t})$ to be Gaussian. Further, Eqn. (19) can be solved by algorithms such as multi-way graph cut algorithm, max-product belief propagation, and so forth. The max-product belief propagation (BP) algorithm and its variants are distinguished with their distributed and parallel computational paradigm and impart distributed computation to the M-step.

In accordance with an embodiment of the invention, in order to track a target even when it is partially occluded, we consider a K-part decomposition of the target. K-part detectors are trained to detect the K parts by collecting training data of a corresponding part. Let us consider the case where the target is divided into three parts, head-shoulder, torso and legs (K=3). Then, the data association variable of a tracker is formed by K parts, that is, $a_{i,t} = (a_{i,1,t}, a_{i,2,t}, \ldots, a_{i,K,t})$, where each $a_{i,k,t}$, k∈K describes an association that assigns a part detection from a corresponding part detector to tracker i. The motion state variable of the tracker is $x_{i,t}$. Conditioned on $x_{i,t}$ and data association variable $a_{i,t}$, the likelihood function $p(z_{a_{i,t},t}|x_{i,t})$ may be expressed as $$p(z_{a_{i,t},t} | x_{i,t}) = \prod_{k=1}^{K} p(z_{a_{i,k,t},t} | x_{i,t}) \quad (20)$$

Further, the association priori $p(a_t)$ may be denoted as $$p(a_t) = \frac{1}{Z} \prod_{(i,j) \in E} \prod_{k=1}^{K} \psi(a_{i,k,t}, a_{j,k,t}) \qquad (21)$$

Thus, in case of K-part decomposition, K graph optimizations can be carried out to obtain the optimal part associations $a^t_{i,t} = (a^t_{i,1,t}, a^t_{i,2,t}, \ldots, a^t_{i,K,t})$ simultaneously.

In accordance with another embodiment of the invention, the tracker i can be used in 3-dimensional (3D) space and the motion state variable of each 3D tracker contains depth information. For example, let $x_{i,t} < x_{j,t}$ denote a motion hypothesis that tracker i is closer to a camera than tracker j and let there be four detections $Z_t = \{z_{1,t}, \ldots, z_{4,t}\}$ that are returned. Conditioned on $x_{i,t} < x_{j,t}$, the four detections are partitioned into $Z_t^1 = \{z_{1,t}, z_{2,t}, z_{3,t}\}$ and $Z_t^2 = \{Z_{4,t}\}$, depending on whether a detection is covered by the projection of the front tracker i. In this case, besides the common constraint $\{a_{i,t} = a_{j,t} \neq 0\}$, all configurations with $a_{j,t} = 4$ are unacceptable since the motion hypothesis is $x_{i,t} < x_{j,t}$. Particle filters may be used to run the trackers due to the non-linearity involved. Thus, the variational probability $Q_i(x_{i,t})$ will be represented by a weighted particle set, and all integral computations discussed earlier will be represented by summations instead.

The E-step can then be written as $$Q'_i(x_{i,t}) \propto \prod_{j \in N(i)} \exp \qquad (22)$$

$$\left\{ \int_{x_{j,t}} Q_j(x_{j,t}) \log p(a'_{i,t}, a'_{j,t} | x_{i,t}, x_{j,t}) dx_{j,t} \right\} \times p(z_{a_{i,t},t} | x_{i,t})$$

$$\int_{x_{i,t-1}} p(x_{i,t} | x_{i,t-1}) p(x_{i,t-1} | Z^{t-1}) dx_{i,t-1} \, i \in \{1, \ldots, M\}$$

where updating of $Q_i(x_{i,t})$ takes each neighboring tracker's $Q_j(x_{j,t})$ into consideration.

The M-step objective remains the same, however, the way of pre-computing $f_{i,j}(a_{i,t}, a_{j,t})$ is modified as $$f_{i,j}(a_{i,t}, a_{j,t}) = \qquad (23)$$

$$\exp \left\{ \int_{x_{i,t}, x_{j,t}} Q'_i(x_{i,t}) Q'_j(x_{j,t}) p(a_{i,t}, a_{j,t} | x_{i,t}, x_{j,t}) dx_{i,t} dx_{j,t} \right\}$$

where an integral evaluated over motions of pair-wise trackers $(x_{i,t}, x_{j,t})$ are required to pre-compute $f_{i,j}(a_{i,t}, a_{j,t})$.

Figure 5A:
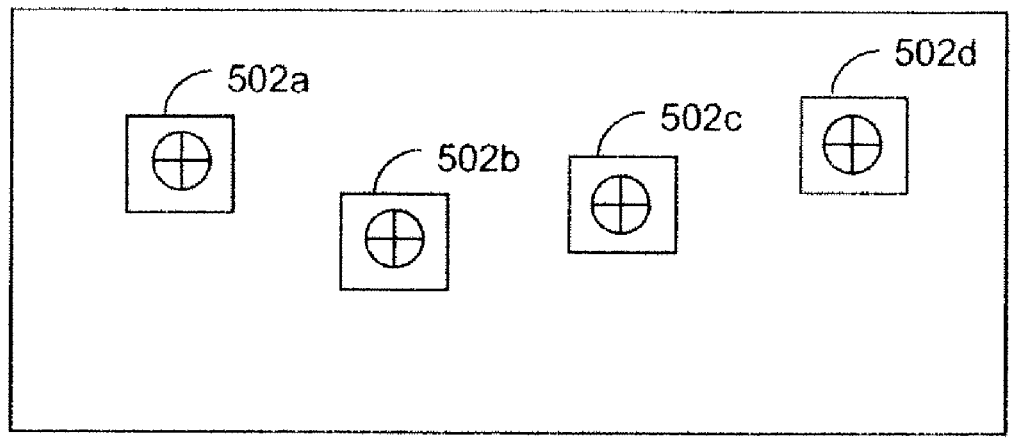
FIG. 5A, 5B and 5C depict association between trackers and targets in consecutive frames in accordance with various embodiments of the invention.
Figure 5B:
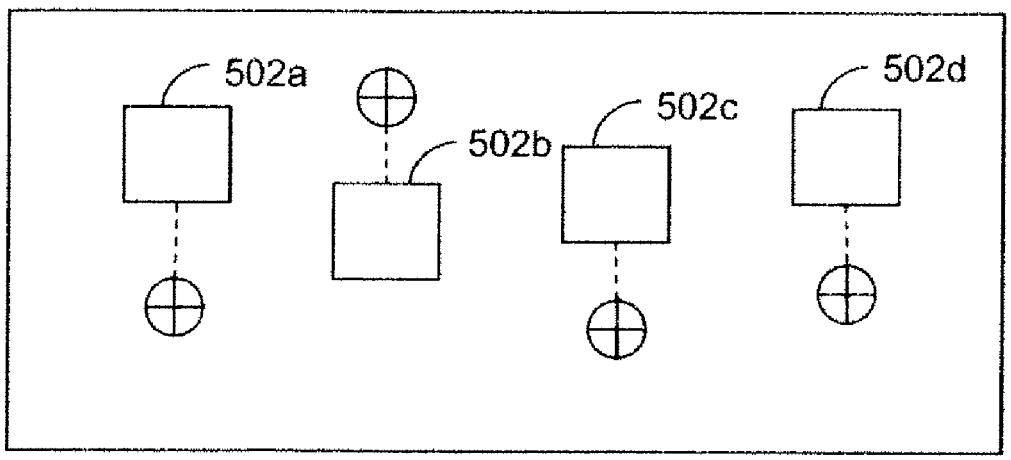
Figure 5C:
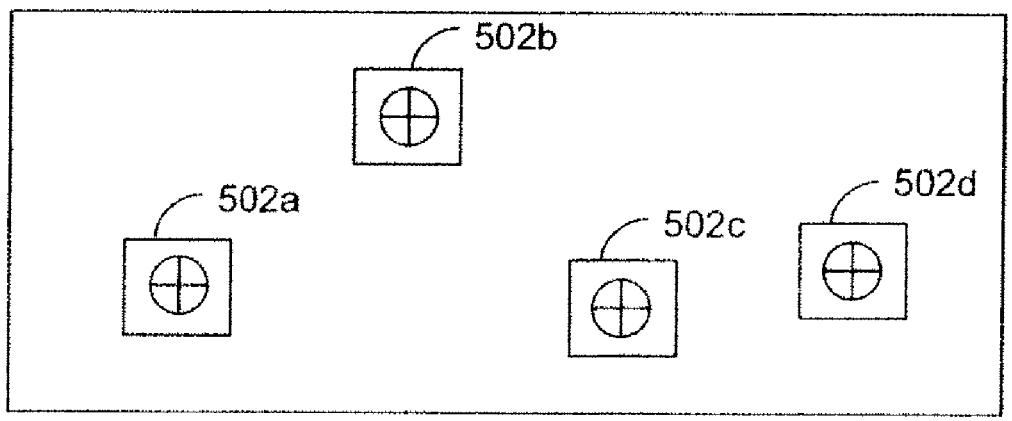

FIG. 5A, 5B and 5C depict association between trackers and targets in consecutive frames in accordance with various embodiments of the invention. FIG. 5A is the output of the variational EM algorithm applied to a frame and includes trackers 502a, 502b, 502c and 502d along with their corresponding targets in a frame. A tracker is represented by a square while each target is represented by a circle having a cross within. As shown in FIG. 5A, each tracker is following a target. Thus, trackers 502a, 502b, 502c and 502d are each associated with a different target present in the frame. FIG. 5B shows the next frame received from a video surveillance camera. From FIG. 5B it can be seen that each of the targets has moved from its earlier position. However, each of the trackers has still maintained an association with its corresponding target. FIG. 5C shows the output of applying the variational EM algorithm to the frame shown in FIG. 5B. As shown, the trackers have also left their earlier positions and are following their corresponding targets. This process continues for every frame received from the video surveillance camera.

Figure 6:
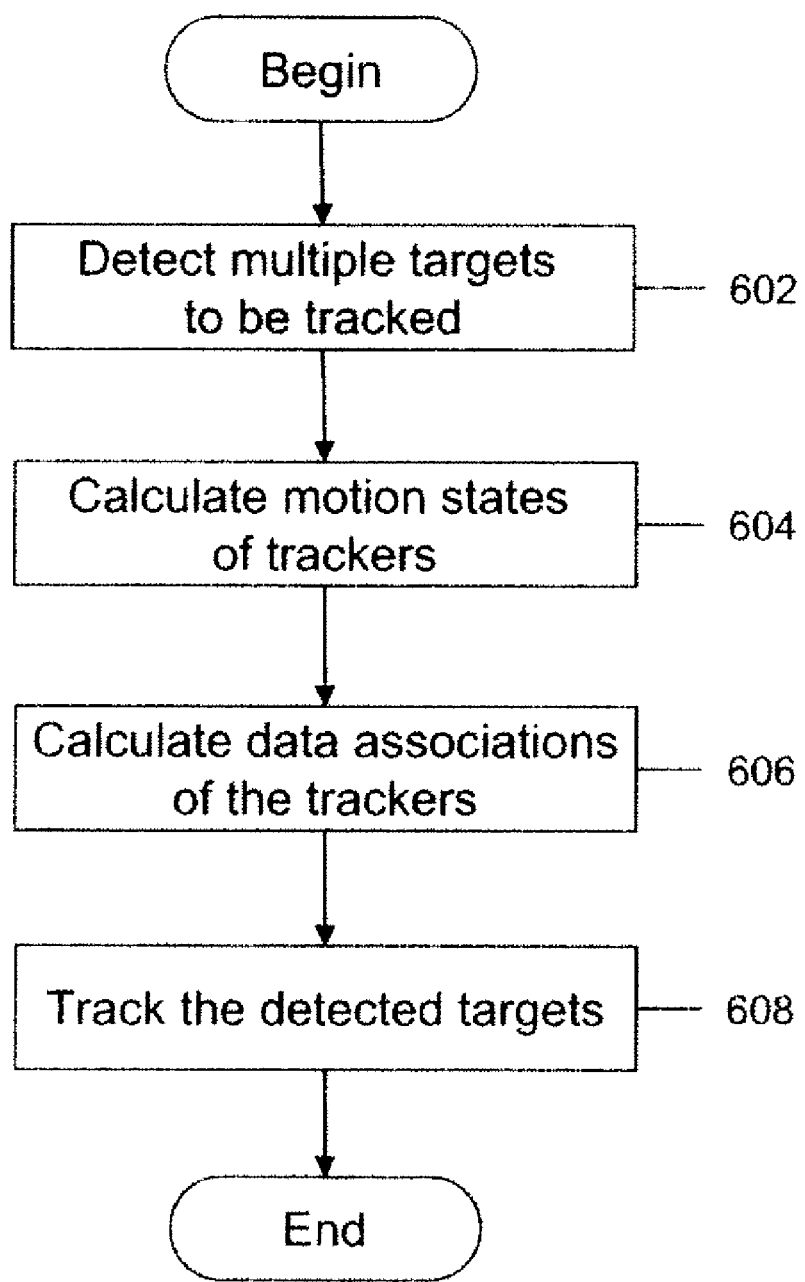
FIG. 6 is a flowchart depicting a method for multiple target tracking in accordance with an embodiment of the invention.

FIG. 6 is a flow chart depicting a method for multiple target tracking in accordance with various embodiments of the invention. At step 602, multiple targets to be tracked are detected in a video frame. The detection of the multiple targets is performed by a detection module and provided to a tracking module. The tracking module includes a plurality of trackers.

At step 604, each of the plurality of trackers calculates its motion state variable. The motion state may refer to any of the target properties such as target location, velocity, scale, and the like. The motion state variable is calculated in the E-step of a variational Expectation-Maximization (EM) algorithm.

At step 606, each of the plurality of trackers calculates its data association variable in the M-step of the variational EM algorithm. When calculating its data association variable, each of the plurality of trackers also informs the other trackers about its current estimation of the data association variable. The other trackers update their data association variable based on the information received.

At step 608, each of the plurality of trackers tracks its corresponding target in the given frame with the help of the variational EM algorithm.

Figure 7A:
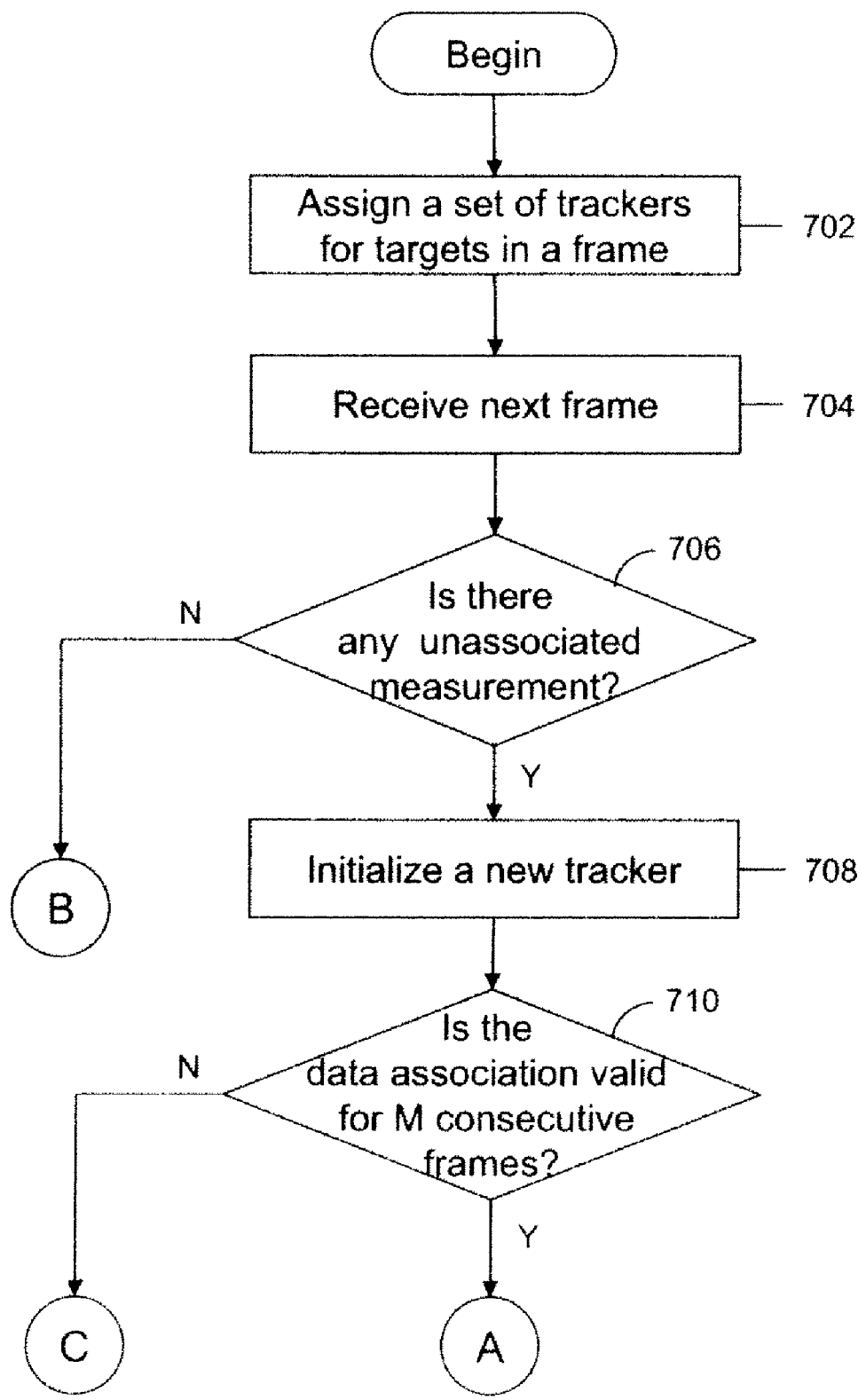
FIG. 7A and 7B are flowcharts illustrating a method for multiple target tracking in accordance with another embodiment of the invention.
Figure 7B:
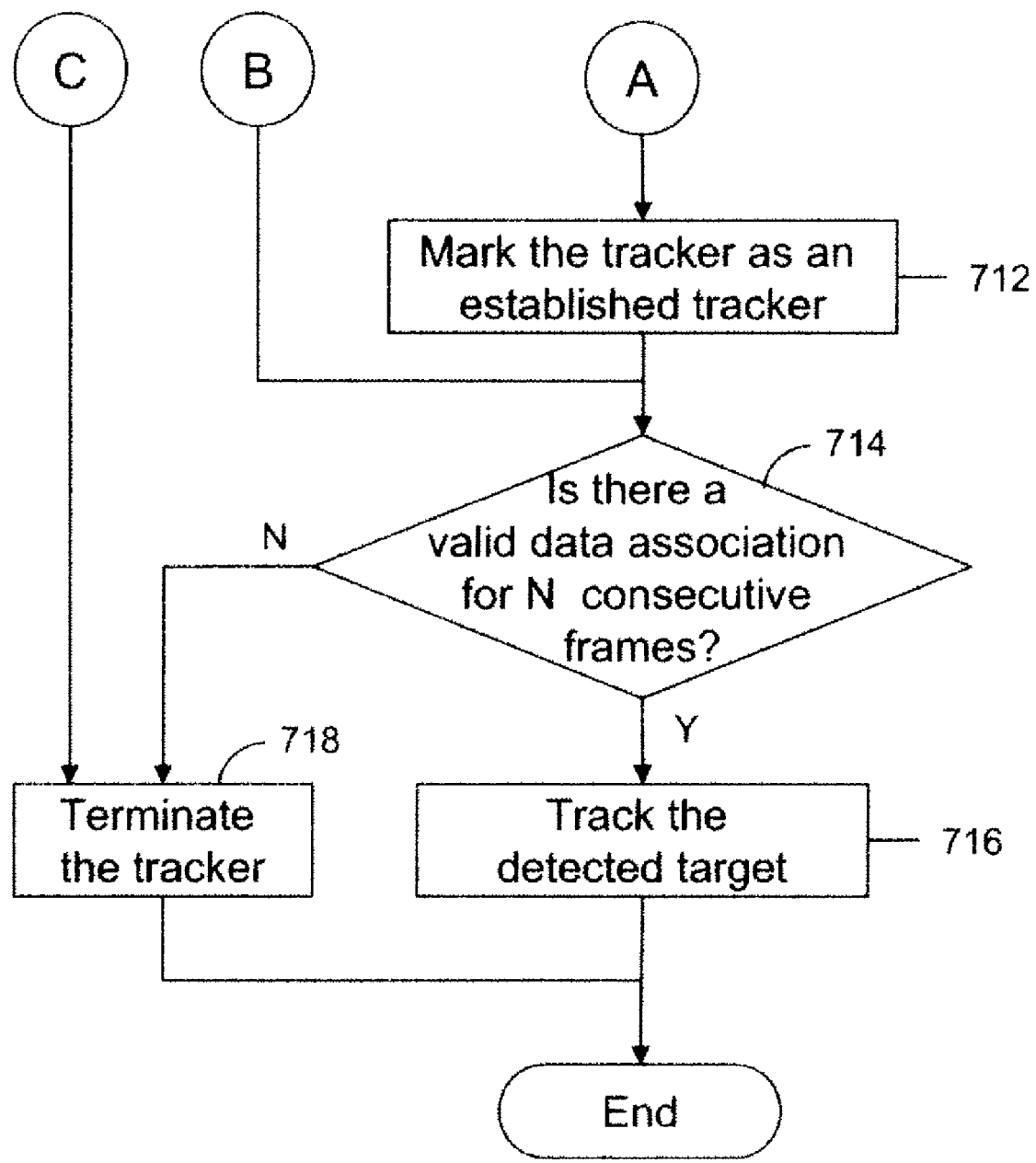

FIG. 7A and 7B are flowcharts illustrating a method for multiple target tracking, in accordance with another embodiment of the invention. At step 702, a set of trackers is assigned to track multiple targets detected in a frame. At step 704, the next frame is received.

At step 706, it is determined if there is any unassociated measurement in the received frame. In other words, it is checked if there is any target that is not associated with any tracker.

At step 708, if there is an unassociated measurement in the received frame, a new tracker is initialized as a temporary tracker. However, if no unassociated measurement is detected, no new tracker is initialized and the process continues at step 714.

At step 710, it is determined if the data association of the temporary tracker is valid for a predefined number of frames. At step 712, if the data association is determined to be valid, the temporary tracker is marked as an established tracker. However, if the data association is not valid, the temporary tracker is terminated, at step 718

At step 714, for every established tracker, it is determined if there exists a valid data association with its corresponding target for a selected number of frames. If there exists a valid data association, the process continues and the targets are continuously tracked, at step 716. However, if the valid data association does not exist, the established tracker is terminated, at step 718.

Thus, the invention provides a method and system for multiple target tracking. A variational Expectation-Maximization (EM) algorithm is used to calculate motion state variables and data association variables of a plurality of trackers. The plurality of trackers track their corresponding targets on the basis of the calculated motion state variables and data association variables. Both the motion state variable and the data association variable are calculated in a distributed manner, thus reducing computational complexities.

One skilled in the art of computer science will easily be able to combine the software created as described with appropriate general purpose or special purpose computer hardware, such as a microprocessor, to create a computer system or computer sub-system embodying embodiments of the invention. An apparatus in accordance with embodiments of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which include embodiments of the invention.

The computer program product of an embodiment of the invention is executable on a computer system for causing the computer system to perform a method of filtering an image including an image filtering method of the invention. The computer system includes a microprocessor, an input device, a display unit and an interface to either the Internet or a network such as Ethernet, and Intranet. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device that enables the computer system to connect to databases and networks such as LAN, MAN, WAN, and the Internet. The computer system facilitates inputs from a user through an input device, accessible to the system through the I/O interface. The various modules may also be in the form of hardware units.

The computer system executes a set of instructions that are stored in one or more storage elements to process input data. The set of instructions may be a program instruction means. The storage elements may also hold data or other information as desired. The storage element may be in the form of an information source or a physical memory element present in the processing machine.

The set of instructions may include various commands that instruct the processing machine to perform specific tasks such as the steps that constitute an embodiment of the method of the invention. The set of instructions may be in the form of a software program. Further, the software may be in the form of a collection of separate programs, a program module with a larger program or a portion of a program module. The software may also include modular programming in the form of object-oriented programming. The processing of input data by the processing machine may be in response to user commands, results of previous processing or a request made by another processing machine.

While only certain features of the invention have been illustrated and described herein, many modifications and changes will occur to those skilled in the art. It is, therefore, to be understood that the appended claims are intended to cover all such modifications and changes as fall within the true spirit of the invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for distributed tracking of multiple targets using a variational Expectation-Maximization (EM) algorithm in a surveillance system, the surveillance system comprising a plurality of trackers tracking the multiple targets, the method comprising: estimating a motion state variable of each of the plurality of trackers, the estimation being performed in the E-step of the variational EM algorithm; estimating a data association variable of each of the plurality of trackers based on a graph-based discrete optimization algorithm, the estimation being performed in the M-step of the variational EM algorithm;

tracking the multiple targets based on the motion state variable and the data association variable of each of the plurality of trackers; and wherein the data association variable of each of the plurality of trackers is estimated as a maximum a posteriori (MAP) estimate in the M-step of the variational EM algorithm.

2. The method of claim 1 further comprising initializing the plurality of trackers to track the multiple targets, wherein the association between the plurality of trackers and the multiple targets is based on a one-to-one mapping.

3. The method of claim 1, wherein the motion state variable of each of the plurality of trackers is estimated as a probability distribution function in the E-step of the variational EM algorithm.

4. The method of claim 1, wherein the E-step and the M-step of the variational EM algorithm are repeated for a predefined number of times to converge the values of the motion state variable and the data association variable in a predefined range.

5. The method of claim 1, wherein the distributed tracking is performed through decomposing at least one of the multiple targets into a predefined number of parts.

6. The method of claim 1, wherein the motion state variable of each of the plurality of trackers comprises information related to the motion state of a corresponding target in 3-dimensional space.

7. A distributed tracking system for distributed tracking of multiple targets using a variational Expectation-Maximization (EM) algorithm in a surveillance system, the system comprising:

a processor including a tracking module comprising a plurality of trackers for tracking the multiple targets, each of the plurality of trackers being associated with a motion state variable and a data association variable;

wherein each of the plurality of trackers estimates the motion state variable in the E-step of the variational EM algorithm;

wherein each of the plurality of trackers estimates a data association variable based on a graph-based discrete optimization formulation, the estimation being performed in the M-step of the variational EM algorithm; and wherein the data association variable of each of the plurality of trackers is estimated as a maximum a posteriori (MAP) estimate in the M-step of the variational EM algorithm.

8. The distributed tracking system of claim 7, wherein the tracking module initializes the plurality of trackers to track the multiple targets, wherein the association between the plurality of trackers and the multiple targets is based on a one-to-one mapping.

9. The distributed tracking system of claim 7, wherein the motion state variable of each of the plurality of trackers is estimated as a probability distribution in the E-step of the variational EM algorithm.

10. The distributed tracking system of claim 7, wherein the E-step and the M-step of the variational EM algorithm are repeated for a predefined number of times to converge the values of the motion state variable and the data association variable in a predefined range.

11. The distributed tracking system of claim 7, wherein the distributed tracking is performed through decomposing at least one of the multiple targets into a predefined number of parts.

12. The distributed tracking system of claim 7, wherein the motion state variable of each of the plurality of trackers comprises information related to the motion state of a corresponding target in 3-dimensional space.

* * * * *